United States Patent [19]

Campbell

[11] Patent Number: 4,806,132

[45] Date of Patent: Feb. 21, 1989

[54] TURNDOWN CONTROL METHOD FOR MEMBRANE SEPARATION SYSTEMS

[75] Inventor: Michael J. Campbell, Clarence Center, N.Y.

[73] Assignee: Union Carbide Corporation, Danbury, Conn.

[21] Appl. No.: 65,482

[22] Filed: Jun. 23, 1987

[51] Int. Cl.⁴ .......................................... B01D 53/22
[52] U.S. Cl. .......................................... 55/16; 55/18; 55/68; 55/158
[58] Field of Search ................. 55/16, 18, 21, 68, 158; 210/637

[56] References Cited

U.S. PATENT DOCUMENTS

| | | | |
|---|---|---|---|
| 3,636,679 | 1/1972 | Batta | 55/26 |
| 3,930,814 | 1/1976 | Gessner | 55/16 |
| 3,975,170 | 8/1976 | Keating, Jr. | 55/16 |
| 3,979,190 | 9/1976 | Hedman | 55/158 |
| 4,140,495 | 2/1979 | Pietruszewski | 55/21 |
| 4,174,955 | 11/1979 | Blackmer et al. | 55/16 X |
| 4,198,213 | 4/1980 | Mannatt | 55/16 |
| 4,264,338 | 4/1981 | Null | 55/16 |
| 4,323,370 | 4/1982 | Leitgeb | 55/18 |
| 4,381,999 | 5/1983 | Boucher et al. | 210/637 |
| 4,397,661 | 8/1983 | King et al. | 55/158 |
| 4,421,529 | 12/1983 | Revak et al. | 55/21 X |
| 4,435,191 | 3/1984 | Graham | 55/21 X |
| 4,537,606 | 8/1985 | Itoh et al. | 55/158 |
| 4,553,988 | 11/1985 | Shimizu et al. | 55/158 |
| 4,643,743 | 2/1987 | Grader | 55/26 |
| 4,659,343 | 4/1987 | Kelly | 55/16 |

FOREIGN PATENT DOCUMENTS

| | | | |
|---|---|---|---|
| 771472 | 11/1967 | Canada | 55/16 |
| 51469 | 5/1982 | European Pat. Off. | 55/16 |
| 60693 | 9/1982 | European Pat. Off. | 55/16 |
| 75431 | 3/1983 | European Pat. Off. | 55/16 |
| 13329 | 3/1982 | Japan | 55/21 |
| 154113 | 9/1984 | Japan | 210/637 |
| 207827 | 11/1984 | Japan | 55/16 |
| 235604 | 10/1985 | Japan | 210/637 |
| 235605 | 10/1985 | Japan | 210/637 |
| 2003742 | 3/1979 | United Kingdom | 55/18 |

Primary Examiner—Robert Spitzer
Attorney, Agent, or Firm—Alvin H. Fritschler

[57] ABSTRACT

Permeable membranes are operated, under reduced demand conditions, by reducing feed flow and the partial pressure driving force across the membrane, using the installed surface area, with product purity and/or flow being reduced. The driving force is reduced by reducing feed pressure and/or increasing permeate side pressure.

12 Claims, 1 Drawing Sheet

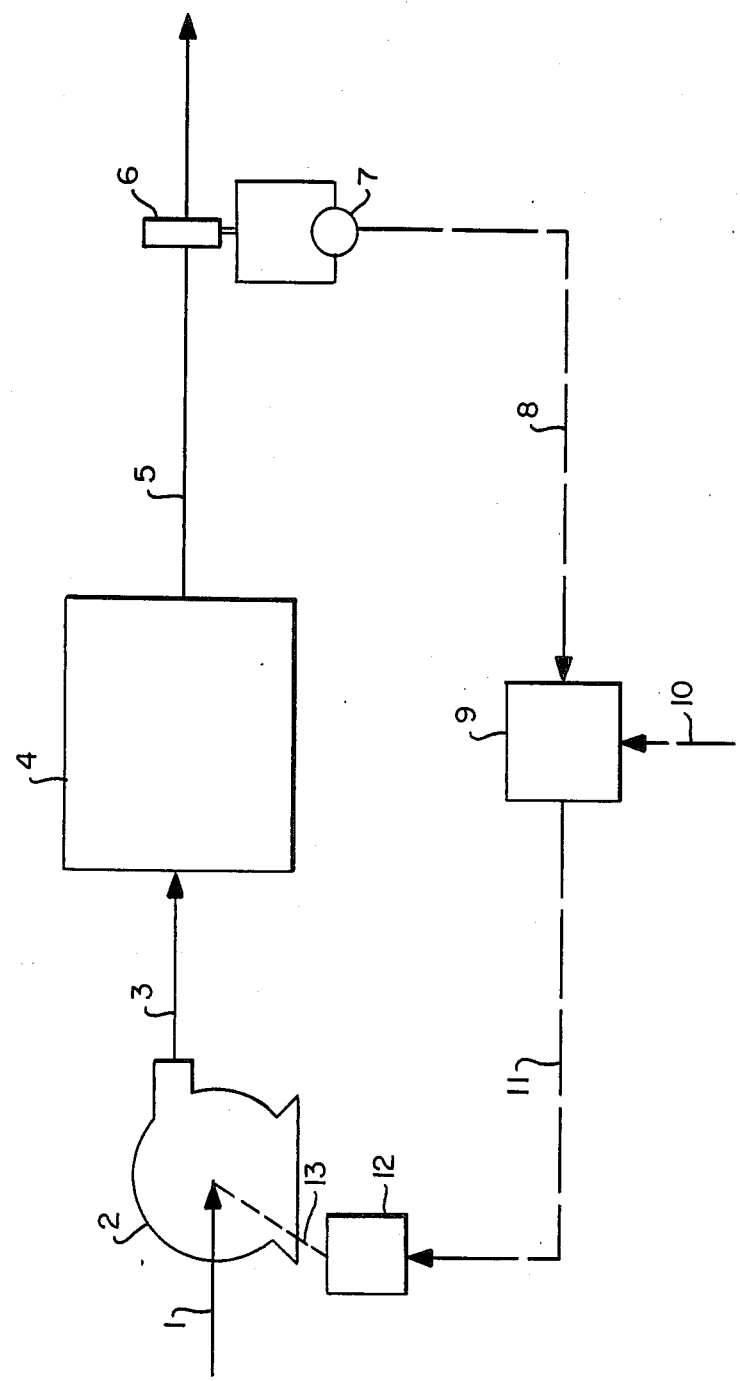

TURNDOWN CONTROL METHOD FOR MEMBRANE SEPARATION SYSTEMS

BACKGROUND OF THE INVENTION

1. Field of the Invention

The invention relates to permeable membrane systems. More particularly, it relates to the use of such systems under variable demand conditions.

2. Description of the Prior Art

Permeable membrane processes and systems are known in the art and are being employed or considered for a wide variety of gas and liquid separations. In such operations, a feed stream is brought into contact with the surface of a membrane, and the more readily permeable component of the feed stream is recovered as a permeate stream. The less readily permeable component is withdrawn from the membrane system as a non-permeate, or retentate, stream.

The inherent simplicity of such fluid separation operations provides an incentive in the art to expand use of membranes in practical commercial operations. It is necessary, of course, that the selectivity and permeability characteristics of a membrane system be compatible with the overall production requirements of a given application. It is also necessary that the efficiency of membrane systems be continually improved in order to enhance the feasibility of employing membrane systems to advantage under the operating conditions encountered in the art.

Significant factors in the design and overall efficiency of membrane systems are the total membrane surface area required for a given separation and the partial pressure difference across the membrane that is required to obtain a desired product quantity and quality, i.e. a desired permeability and selectivity or separation factor. The design of practical membrane systems requires optimization of the trade-offs between membrane surface area and said partial pressure differences. Thus, the greater the partial pressure difference, or driving force, across the membrane, the less is the membrane surface area required for a given separation. This necessitates the use of more expensive pumping equipment and higher pump operating costs, but enables membrane equipment costs to be kept relatively low. If, on the other hand, a lower driving force is employed, more membrane surface area is required, and the relative costs of the various aspects of the overall system and operation would change accordingly.

Membrane systems are usually designed and optimized for full capacity, steady constant flow conditions, i.e. design conditions, that are not always fully utilized in practice. Under operating conditions other than the design conditions, different combinations of optimum operating conditions will prevail with respect to membrane area versus partial pressure differences. Fluid separation applications for which membrane systems are desirable typically do not run under steady flow conditions. The demand from the membrane system will often vary in terms of product quantity and/or quality. For example, product demand for nitrogen gas from an air separation membrane system can vary significantly in a 24 hour period in terms of nitrogen flow rate and/or purity required.

Membrane systems typically operate in one of three modes during off demand, or so-called turndown conditions. In one approach, there is no turndown to accommodate decreases in product demand. In this case, the feed flow and partial pressure differences remain constant. The product quality will, as a result, increase to above design level, while the power requirements will remain at the full design level. This approach is thus disadvantaged in that no power reduction is realized, and the product is obtained at greater than required quality levels.

In another approach, the membrane surface utilized for separation is varied. Under reduced demand conditions, a portion of the membrane area is shutdown. This reduces the amount of the feed stream that is processed in order to satisfy the reduced demand. The disadvantage of this approach is the inefficiency associated with the lack of use of available membrane surface area. This factor assures that the trade-off between membrane surface area and partial pressure difference is not optimized for off-design turndown conditions.

In a third approach to reduced demand conditions, the membrane system is operated at design conditions when in operation, and a surge tank is used to handle variable demand requirements. When the surge tank is full, the membrane system is either unloaded, i.e., the feed pumps are idled, or shutdown to save energy. This approach also has the disadvantage of not fully utilizing installed membrane area since this membrane area is not utilized at all during periods of plant idle or shutdown. Such start/stop operation also has the disadvantage of increased wear on associated equipment.

There is a genuine need in the art, therefore, for a method of fully and efficiently utilizing the separation capability of the installed membrane area under turndown conditions. Such a method would enable an installed membrane system to operate at an optimum efficiency at all times, and would provide more reliable operation than the start/stop mode referred to above.

It is an object of the invention, therefore, to provide an improved method for operating a permeable membrane system under turndown conditions.

It is another object of the invention to provide a method for enabling the full separation capacity of an installed membrane system to be efficiently employed under reduced product demand conditions.

With these and other objects in mind, the invention is hereinafter described in detail, the novel features thereof being particularly pointed out in the appended claims.

SUMMARY OF THE INVENTION

Improved turndown control is achieved by reducing the feed stream flow and the partial pressure driving force at reduced demand conditions, while fully utilizing the installed membrane surface area under all operating conditions. The desired quantity and quality of product can thus be efficiently achieved with increased membrane plant reliability due to reduced equipment loading under turndown conditions and the avoiding of the increased wear associated with start/stop type operation under variable demand conditions.

BRIEF DESCRIPTION OF THE DRAWINGS

The invention is hereinafter further described with reference to the accompanying drawing which is a schematic drawing of a membrane system adapted for the practice of a generally preferred embodiment of the turndown control method of the invention.

DETAILED DESCRIPTION OF THE INVENTION

The objects of the invention are accomplished by employing a turndown control method in which, upon reduced demand, the feed flow rate and the partial pressure driving force across the membrane are reduced. The partial pressure driving force is a function of the partial pressures of the components of the feed and permeate streams. Such lower energy operation is carried out while fully utilizing the installed membrane surface area not only under design conditions, but under all reduced demand operating conditions as well. With the resulting constant, steady operation of equipment under reduced load at turndown conditions, a more efficient operation can be achieved, and the increased wear of start/stop operation can be avoided.

The turndown method of the invention is initiated by a demand signal that indicates off design conditions are required. This signal can be a product flow measurement that indicates below design flow, or a purity input that likewise indicates that below design conditions are required. The membrane system is conventionally designed to incorporate a process computer programmed to reduce the operating pressure ratios across the membrane to new optimum conditions based upon the full utilization of membrane surface area available in the system. The desired pressure ratio reduction is accomplished by sending a turndown signal to the pumping equipment, i.e., the compressor, vacuum pump, liquid pump, etc.

With reference to the drawing, illustrating a generally preferred system for carrying out the turndown control method of the invention, inlet line 1 is used to deliver feed gas to compressor 2, from which pressurized feed gas is delivered in line 3 to permeable membrane unit 4. The desired product stream, either permeate or non-permeate gas, is discharged through product flow line 5. The other stream removed from membrane unit 4, not shown, is either discarded or used for some desired purpose. A standard product flow meter 6 is positioned in line 5, with said meter having a conventional product flow signal transmitter associated therewith and being adapted to send an input signal, generally illustrated by the numeral 8, to process computer/controller 9. Thus, product flow meter 6 is used to monitor product flow, and transmitter 7 is employed to send a process variable signal, i.e., a signal proportional to the product flow, to process computer 9. Also employed as an input to said computer is a purity set point, represented by the numeral 10, that can be varied depending upon the product purity requirements of the operation.

Process computer 9 is programmed to send an output signal, represented by the numeral 11, to capacity control device 12 that is used to turn down compressor 2, by an appropriate mechanical or electrical connection, represented by the numeral 13, by adjustment of the appropriate recycle valve, suction valve, variable speed motor or the like, to the pressure and flow conditions appropriate for the indicated demand conditions. The method of the invention is highly flexible in that, as the design conditions change, as a result of differences in process application, improvements in membrane performance, and the like, the process computer can readily be reprogrammed to match the new design conditions of the different or modified process application.

In a processing alternative, product purity level can be used as a process variable to trigger membrane system turndown control. In this case, product purity rather than product flow, would be monitored, and a signal proportional to product purity would be sent to process computer/controller 9. The computer would, in this case, be programmed to modulate compressor capacity and pressure to maintain the desired purity.

Those skilled in the art will appreciate that the desired product purity can often be a variable input from the downstream operation for which the product gas or liquid is being produced in the membrane system being controlled. As the product flow is cut back, product purity will start to rise, and the process computer will sense this rise and cut back the compressor loading. It should be noted, however, that the use of product purity as the primary measurement can result in a certain element of instability in some cases as a result of the inherent lag time involved in the collection and analysis of product purity. By contrast, it is readily possible to achieve instant monitoring of product flow changes.

The invention is further described with reference to an illustrative example in which permeable membranes are employed for air separation to produce nitrogen product gas. Using a typical membrane system in which the membrane material is capable of separating oxygen as the more readily permeable component of air, it will be understood that the desired nitrogen-enriched product stream is recovered as non-permeate, retentate gas. The oxygen-enriched permeate gas constitutes a waste stream in this instance. Feed air is compressed to superatmospheric pressure, and the product nitrogen non permeate stream is withdrawn from the membrane system at slightly below feed pressure. The permeate gas is withdrawn typically at atmospheric pressure. The membrane system is constructed and used on the basis of design conditions, i.e., desired full capacity operation, generally optimized in light of the desired product flow and purity, the pressure levels and desired partial pressure driving force required, the value of utilities, e.g., power costs.

For any given pressure ratio across the membrane, the gas or other fluid separation operation is characterized by two key parameters, namely area factor and compressor factor. The area factor is the amount of membrane surface area required, in the illustrative example, to produce one ncfh, i.e. normal cubic foot per hour, of product nitrogen gas. The compressor factor is the amount of feed gas required to produce one ncfh of said product. Once the product requirements of a given application are established, the optimum or desired pressure ratio across the membrane, and the corresponding area factor and compressor factor, can be determined.

The optimization of these processing variables will be understood to involve the optimizing of the trade-off between higher compressor costs, and associated power requirements, at higher pressure ratios and the greater product flow that can be produced at such higher pressure ratios. In the air separation application, the greater product flow is associated with a higher feed pressure, as the permeate pressure is commonly and conveniently fixed at atmospheric pressure.

As suggested above, product flow is generally increased at higher feed pressures, and vice versa, for constant product purity, constant membrane area operation. Likewise, for constant purity operation, the area factor is generally decreased as the feed pressure is increased. In addition, for constant product purity, constant membrane area operation, the feed flow, i.e., compressor flow, is generally increased at higher feed pressures, and vice versa. Such relationships are taken into consideration in determining the design conditions, i.e., full demand conditions, desirably optimizing the indicated trade-offs so as to achieve design conditions that are optimized for the particular membrane system and the production requirements of a given application.

In an illustrative air separation operation, a membrane plant is optimized at full demand conditions to operate at a feed gas pressure of 200 psi and produce 1,000 ncfh of 98% nitrogen as non-permeable gas. If product demand were to decrease to 7,000 ncfh, the full utilization of the available membrane area can be maintained, in the practice of the invention, by decreasing the feed gas pressure to 145 psig, with the product purity being maintained essentially at the design purity level. In addition to the reduced feed gas pressure, the feed air flow requirements to produce the 7,000 ncfh of nitrogen product are also decreased. At the lower feed gas pressure of 145 psig, a lesser amount of gas permeates through the membrane, and less feed gas is required to achieve the desired turndown production. In the above-indicated turndown example, in which the desired product is turned down from 10,000 ncfh to 7,000 ncfh and the feed air pressure is reduced from 200 psig to 145 psi, the compressor flow, i.e., feed flow to the membrane system, is found to be 72% of full design flow. Thus, the conditions to maintain the full use of the available membrane area upon turndown, while producing product at the design purity level, comprise the indicated reduction in the driving force across the membrane, e.g. by the reduction of the feed gas pressure, coupled with the indicated turndown from the design feed stream flow.

The amount of energy savings achieved upon turndown will depend upon the type of compression equipment employed in the practice of the invention. It will be understood that a variety of capacity control devices are available in the art depending on the type of compression equipment employed. Variable speed motors, internal recycle valves, and suction valve unloaders are examples of the available devices that can be used to turndown compression equipment in accordance with the invention.

As the compression equipment, i.e. reciprocating compressors have suction valve unloaders, oil flooded screw compressors with internal valves for recycle back to the suction point, or other such commercially available equipment, receives a signal for turndown, its feed stream flow and the pressure ratio across the membrane is reduced, which results in reduced power draw. In automated embodiments of the invention, the process computer referred to above can be programmed to automatically set the compression equipment and control turndown mechanism, i.e. the valve unloader, variable speed motor, etc., to enable optimum flow rates and pressure ratios across the membrane to be employed for a given demand signal, i.e. flow or purity signal.

In the illustrative embodiment referred to above in which a screw-type compression system is used with an internal recycle valve, the power draw for the turndown from 10,000 to 7,000 ncfh of nitrogen is 77% of design. At the reduced feed gas pressure of 145 psig, the power draw is 85% of the design value. The total power draw is reduced by both factors, i.e. the decrease in the feed gas volume and in the feed gas pressure to produce a reduction in the driving force across the membrane, so that the total power draw is 85% of 77% of design. or 65% of the power draw under design conditions.

It should be noted that the turndown control method of the invention can be used effectively in embodiments in which product purity turndown, rather than product flow turndown, is desired. If reduced product purity is required at constant product flow, the feed pressure can be lowered, to decrease the pressure differential across the membrane, while the product flow is maintained at the design condition level. In such embodiments, the total membrane surface area available is again fully utilized during the turndown operation. Those skilled in the art will appreciate that the process computer referred to above can also readily be programmed to automatically adjust the compression system operation to account for product purity and product flow turndown control simultaneously. In this use, the pressure differential creating the driving force across the membrane would be varied in response to changes in both product purity and flow, and could be optimized in light of the overall requirements and operating conditions pertaining to a given gas or other fluid separation operation.

It will be appreciated that the efficiency of the turndown control is dependent upon the compression system design employed in a given membrane separation operation and its ability to efficiently control the feed stream flow to the membrane. It should also be noted that the efficiency of the turndown control method of the invention is subject to the product pressure requirements of a given application. In the air separation for nitrogen recovery example above, if a minimum product pressure of 100 psig were required, then the limit of turndown would be to 45% of the maximum product flow of the compression system. In most cases, however, this factor should not affect the overall turndown efficiency because, typically, the optimum design membrane operating pressure is significantly higher than the required product pressure. For a great majority of applications, therefore, the practice of the invention will be both feasible and the most efficient method of turndown control. Those skilled in the art will appreciate that the turndown method of the invention will desirably be optimized to the extent warranted by the importance of the turndown operation in the overall process being controlled. The choice of a compressor system and the design operating pressures are significant parameters in determining turndown efficiency and rangeability in practical commercial operations. It should also be understood that the invention does not relate simply to turndown from design conditions to one particular set of lower feed flow rate and driving force conditions, but to the adjustment of said conditions between said design conditions and various lower demand conditions, or adjustment between different lower demand conditions, in which product recovery at lower than design quantity and/or purity is desired. It should also be noted that, although design conditions represent the full capacity of a given membrane system with respect to a desired product flow and purity, it is generally possible to operate a membrane system at above its design capacity, so as to produce either a greater than design quantity of product at some sacrifice of product purity, or a product at above design purity at some sacrifice of product recovery. Operation at such above design conditions shall be understood to constitute essentially design conditions with respect to the turndown features of the invention. From the description herein, it will be appreciated that turndown conditions prevail if either the product flow or the product purity requirements, or both, are less than the design product flow and purity levels for a given membrane system.

It is within the scope of the invention to practice the turndown method herein described and claimed in a wide variety of fluid separation operations, of which the air separation for nitrogen production embodiment referred to above is an illustrative example in which turndown conditions are encountered. Such operations include any in which a permeable membrane system can be effectively employed to separate a more readily permeable component from a fluid mixture thereof with a less permeable component. A hydrogen-containing offgas, as from a desulfurization unit, is an example of another suitable feed stream for use in permeable membrane operations, and for the turndown control method of the invention. A typical off-gas of this nature may contain about 45 mole % hydrogen, 25% methane, 25% ethane and smaller amounts of other hydrocarbons. The membrane system approach can be used to purify said hydrogen to a desired purity level, e.g. about 90%. The recovery of hydrogen from ammonia purge gas, and carbon dioxide and methane separations, are illustrative examples of other commercial fluid separation operations to which the turndown method of the invention can be applied in appropriate circumstances. It should also be noted that, while the air separation application is described above with respect to the convenient discharge of the permeate oxygen stream at atmospheric pressure, other suitable and preferred pressure conditions will pertain in various other embodiments of the invention. In some instances, it may be desirable to utilize an available feed pressure under turndown conditions, with the driving force reduction across the membrane being accomplished by increasing the permeate pressure rather than by decreasing the feed gas pressure. The product purity and/or product recovery achieved will, of course, vary somewhat depending upon the overall requirements of any given membrane separation operation.

The turndown control of the invention can be used with respect to any desired permeable membrane system. Thus, the membrane material employed can be any suitable material capable of selectively permeating a more permeable component of a gas or other fluid mixture, e.g. cellulose derivatives such as cellulose acetate, cellulose acetate butyrate, and the like; polyamides and polyimides, including aryl polyamides and aryl polyimides; polysulfones; polystyrenes and the like. It should also be noted that it is within the scope of the invention to employ permeable membranes of any desired configuration. Thus, the permeable membrane may be in composite form, having a separation layer that determines the selectivity and permeability characteristics of the membrane positioned on a porous support layer. Asymmetric-type membranes, in which a relatively dense surface region determines the selectivity and permeability characteristics of the membrane and a more porous region provides support, can also be employed. Other forms of membranes, e.g. dense membranes, are also useful for particular applications. The permeable membranes, for purposes of the invention, can be in any desired form, such as flat sheet, hollow fiber, spiral wound, or other desired form, with hollow fiber membranes being generally preferred. Hollow fibers or other desired forms of membrane material are generally assembled into membrane modules comprising hollow fiber bundles, pleated flat sheet membrane assemblies, or spiral wound cartridges, having feed inlet and permeate exit sides, with conduit means being provided for the separate removal of the non-permeate portion of the feed stream and for the removal of the permeate portion thereof. All such systems can be effectively turned down in accordance with the invention, with the installed membrane surface being fully utilized under all operating conditions.

The invention thus provides a highly practical and efficient means of turndown control. Not only is the installed capacity of the membrane system fully utilized, but the use of a start/stop type operation in response to variable demand or turndown conditions is avoided. As a result, membrane systems can be conventionally used to achieve a desired quantity and quality of product under turndown conditions, with the reliability of the membrane system being increased by the constant, steady operation of equipment under reduced load, turndown conditions.

I claim:
1. In a permeable membrane process in which, under design operating conditions, a fluid feed stream is passed, at a desired feed flow rate and pressure, into contact with the feed side of a permeable membrane system having an installed membrane surface area capable of selectively permeating a more readily permeable component of said feed stream containing a less readily permeable component, with a desired amount of said less readily permeable component being withdrawn at essentially the design feed stream pressure level as non-permeate and with a desired amount of the more readily permeable component being withdrawn at a lower pressure level as permeate, with the partial pressure of said feed stream components across the membrane providing the driving force for said permeable membrane separation, the improved turndown control method comprising:
  (a) maintaining the feed stream flow rate and the partial pressure driving force across the membrane such that the quantity and purity of the permeate and non-permeate obtained are at the design quantity and purity levels, with the installed membrane surface area of the membrane system being fully utilized;
  (b) monitoring the quantity and/or purity of the product stream, either permeate or non-permeate, in the product flow line downstream from the membrane system;
  (c) sending a process variable signal proportional to the product flow and/or product purity in said product flow line to a process computer system adapted to send a corresponding output signal to a capacity control device for control of the feed flow rate and/or pressure conditions to the membrane under design and variable demand conditons;
  (d) reducing the feed flow rate and said driving force across the membrane, while continuing to maintain the full use of the installed membrane surface area of the system, during periods of reduced demand for quantity and/or purity of the product stream, either permeate or non-permeate, in response to output signals from said capacity control device, so that the product stream is withdrawn from the membrane system at the desired turndown quantity and/or quality during said turndown periods of reduced demand; and (e) adjusting the feed flow rate and said driving force across the membrane between the design conditions of step (a) for design demand conditions, wherein the product stream, either permeate or non-permeate, is obtained at the design quantity and purity levels, and lower feed flow rate and driving force conditions during step (d) for lower demand conditions in which the product stream is recovered at lower quantity and/or purity levels than said design levels, in response to said output signals from said capacity control device in response to said process variable signals proportional to the desired product flow and/or product purity in the product flow line from the membrane system, whereby the efficiency of the membrane process is enhanced by the full utilization of the available membrane surface area under variable demand conditions.

2. The turndown method of claim 1 in which the driving force across the membrane is reduced, during step (d), by reducing the feed stream pressure during periods of reduced demand.

3. The turndown method of claim 1 in which the permeate stream is the desired product stream.

4. The turndown method of claim 3 in which said feed stream comprises a hydrogen-containing stream and said product permeate stream comprises purified hydrogen.

5. The turndown method of claim 4 in which the driving force across the membrane is reduced, during step (d), by increasing the permeate pressure during periods of reduced demand.

6. The turndown method of claim 1 in which the non-permeate steam is the desired product stream.

7. The turndown method of claim 6 in which said feed stream comprises air, and said product non permeate stream comprises a nitrogen-enriched stream.

8. The turndown method of claim 7 in which the driving force across the membrane is reduced, during step (d), by reducing the feed stream pressure during periods of reduced demand.

9. The turndown method of claim 1 in which said periods of reduced demand comprise periods in which the demand is for a less than design quantity of product to be supplied at the design purity level.

10. The turndown method of claim 1 in which said periods of reduced demand comprises periods in which the demand is for a less than design purity product to be supplied at the design quantity level.

11. The turndown method of claim 1 in which the driving force across the membrane is reduced, during step (d), by increasing the permeate stream pressure during periods of reduced demand.

12. The turndown method of claim 1 in which the permeable membrane system comprises membrane modules containing hollow fiber membranes.

* * * * *